United States Patent [19]

Hitchner et al.

[11] 4,398,329
[45] Aug. 16, 1983

[54] ROLLER SKATE BEARING

[75] Inventors: John A. Hitchner, New Hartford; Henry A. Klipp, Berlin, both of Conn.

[73] Assignee: Virginia Industries, Inc., Rocky Hill, Conn.

[21] Appl. No.: 282,447

[22] Filed: Jul. 13, 1981

[51] Int. Cl.[3] ............................................. B21H 1/12
[52] U.S. Cl. ........................ 29/148.4 R; 29/148.4 B; 29/148.4 C; 29/149.5 R; 308/216; 308/189 R
[58] Field of Search ................... 29/148.4 R, 148.4 A, 29/148.4 C, 149.5 C, 149.5 DP, 724, 453; 308/216, 189 R, 190, 193, 195

[56] References Cited

U.S. PATENT DOCUMENTS

| | | | |
|---|---|---|---|
| 886,950 | 5/1908 | Cornforth | 29/148.4 R |
| 1,040,274 | 10/1912 | Chambers | 29/148.4 R |
| 1,630,715 | 5/1927 | Nice | 29/148.4 R |
| 2,624,104 | 1/1953 | Finstead | 29/724 |

Primary Examiner—Francis S. Husar
Assistant Examiner—David B. Jones

[57] ABSTRACT

An unground ball bearing is manufactured by forming a straight-sided cup shaped outer race having an aperture in the base and a radially inwardly extending flange about the periphery of the cup rim. The outer and inner races are heat treated and subjected to a surface finishing step and the ball bearing is subsequently assembled by inserting the balls within the outer race and then snapping the inner race into position within the outer race by forcing it past the flange on the outer race.

8 Claims, 3 Drawing Figures

ROLLER SKATE BEARING

BACKGROUND OF THE INVENTION (1) The present invention relates to the manufacture of unground bearings. Specifically, this invention is directed to an improved unground ball bearing.

(2) Description of the Prior Art

Unground bearings are generally well known and are used in many applications. This type of bearing is less expensive to produce when compared to ground bearings in which the inner and outer races are precision machined. However, unground bearings produce a relatively high degree of noise and more wobbling due to the low manufacturing tolerances.

A major disadvantage with prior unground ball bearings is their short life span. This short life span is in part due to the fact that the manufacture of the typical unground bearing includes a crimping operation wherein a peripheral edge portion of the outer race defining member is bent over the inner race defining member to retain the inner race and the bearings within the outer race. This crimping operation cannot be performed on a heat treated part because such a heat treated race would distort during crimping. Accordingly, prior art practice has been to heat treat the entirely assembled bearing, which results in an uneven hardness of the metal comprising the bearing races. This uneven hardness occurs between those areas of the inner and outer races in contact with the balls and those areas not in contact with the balls during heat treating. The reason for this uneven hardness is that the balls conduct some of the heat away from the races. Thus, the races will wear unevenly which increases the noise and wobbling.

Another disadvantage with prior unground ball bearings, which also results from the heat treatment of the assembled bearing, is the scaling of the inner surfaces of the races. This scaling results from the heat treating of the metal. With the ball bearings being fully assembled, removal of this scale is inhibited and thus the wear of the ball bearing is increased by the friction caused by the scale.

As noted above, the heat treatment of previously produced unground ball bearings, particularly bearings of small size such as employed in roller skates, had to be performed after full assembly since the side wall of the outer race would have bowed outwardly if it was crimped around the inner race after being hardened. A straight outer race wall is mandatory for most bearing applications.

Furthermore, the previously used method of assembling unground ball bearings resulted in lost balls. Typically, the balls were first positioned between the inner and outer races and then the outer race would be crimped over the inner race. During the crimping operation, balls would fall out from between the races thereby resulting in a defective product. The noise level and resulting wobbling would be dramatically increased in a bearing which did not possess the proper quantity of balls.

SUMMARY OF THE PRESENT INVENTION

The present invention overcomes the above-discussed disadvantages and other deficiencies of the prior art by providing an improved unground ball bearing in which the metal comprising the inner and outer races has an even hardness.

In accordance with the present invention the inner and outer race defining members of a ball bearing are formed by stamping and drawing operations. The outer race defining member is formed with an inwardly extending flange at one edge thereof by a technique which insures that the side walls will remain flat and parallel with the bearing axis. The dimensions of this flange and the maximum outer diameter of the inner race defining member are such as to allow the inner race to be subsequently snapped into and then captured by the outer race. Both the outer and inner race defining members undergo heat treatment separately and subsequently undergo a surface treatment step for the removal of the heat treatment scale and/or to plate at least the bearing contacting surfaces.

The bearing is then assembled by positioning the balls in the heat treated and finished outer race and subsequently snapping the inner race into position. In order to prevent loss of any balls, the outer race is positioned around a die button before the balls are inserted.

The fully assembled ball bearing has a longer life than previous unground bearings since the races are evenly hardened and the surfaces of the bearings have an improved finish. Furthermore, the assembly of the unground ball bearing of the present invention is simplified when compared to prior art techniques.

BRIEF DESCRIPTION OF THE DRAWINGS

The present invention may be better understood and its numerous objects and advantages will become apparent to those skilled in the art, by reference to the accompanying drawing wherein like reference numerals refer to like elements in the several FIGURES and wherein.

DESCRIPTION OF THE PREFERRED EMBODIMENT

Figures 1, 2:
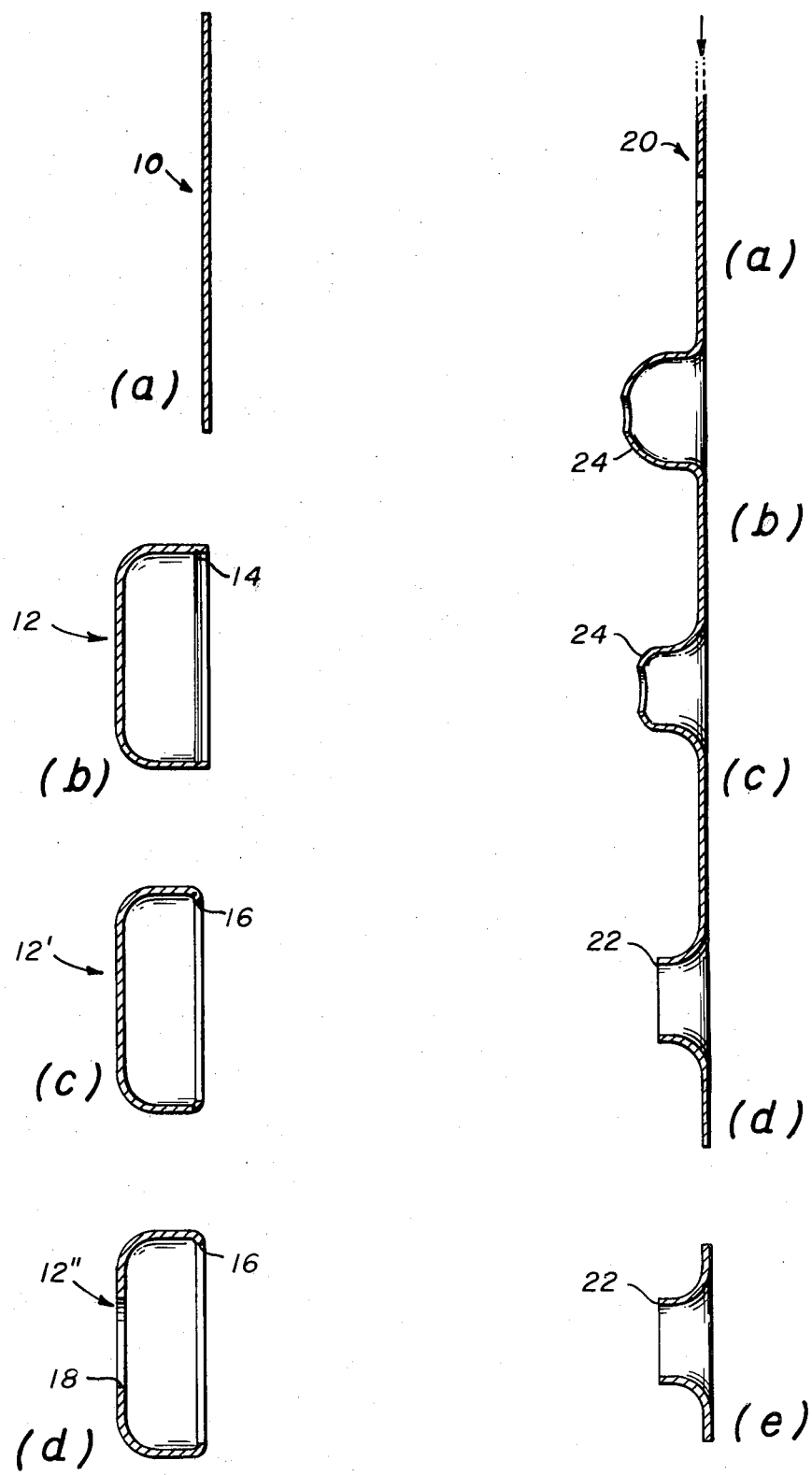
FIG. 1 consists of a series of cross-sectional views of an outer race as it undergoes the various production steps.
FIG. 2 consists of a series of cross-sectional views of an inner race as it undergoes the various production steps.

With reference to FIG. 1, a series of cross-sectional views depicting the production of the outer race are seen. A disc 10, comprised of a malleable metal such as steel, is punched from strip stock so as to have appropriate diameter to allow the production of the desired outer race (See FIG. 1(a)). A cup-shaped intermediate 12, having the general configuration of the outer race is formed from disc 10 in a progressive die as a shell. The cup 12, and the final inner race defining member 12", must have a flat exterior side wall which is parallel with the axis of cup 12. The inner surface of cup 12 adjacent the periphery thereof is scored to provide a recess or groove 14 (See FIG. 1(b)). The groove 14 is preferably a V-shaped 60° cut provided in the metal surface. The spacing of this scoring from the edge of cup 12 should be such so as to allow a rim or flange of short length to be bent inwardly. The length of this flange will be selected so that the inner race may be snapped past the flange into the outer race. The flange length is primarily dependent upon the maximum outer diameter of the inner race and is also dependent on the material from which the races are formed.

The top edge of cup 12 is bent along the scoring (see FIG. 1(c)) to provide a rim or flange 16, and then a coaxial hole 18 is punched through the base of cup 12' (See FIG. 1(d)). It should be noted that the provision of the groove 14, and the punching of the hole 18 as the last step in the formation of the outer race, are necessary in order to prevent bulging or buckling of the side walls of outer race 12" when the rim 16 is formed.

Referring to FIG. 2, cross-sectional views depicting the production of the inner race are seen. A strip of metal 20 of sufficient width to allow the formation of the inner race is first pierced, as indicated in FIG. 2(a), to form a stress-breaker aperture. The strip 20 is then drawn into the general shape of the inner race by an "eyelet" process in a progressive die. This forming process starts with the drawing of a cup 24 as indicated in FIG. 2(b). The cup 24 is then redrawn to the approximate final dimensions of the inner race (See FIG. 2(c)). The cup 24 is then flattened, burnished and qualified to size as indicated in FIG. 2(d). Finally, the inner race 22 is formed by blanking the part from strip 20 (FIG. 2(c)).

Figure 3:
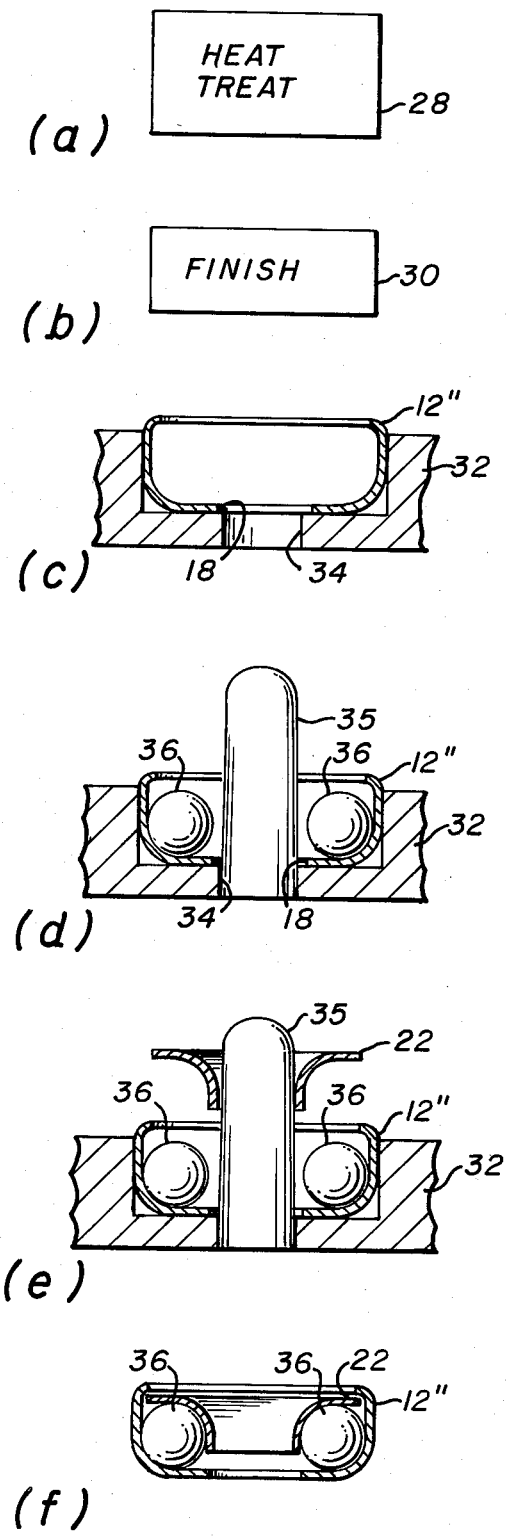
FIG. 3 depicts, partly in block diagram form and partly in cross-sectional views, the final assembly of a bearing in accordance with the present invention.

As seen in FIGS. 3(a) and (b), the inner and outer races 12" and 22, respectively, are separately subjected to a heat treatment step 28, to case harden the races, and a subsequent finishing step 30. The finishing step 30 may involve barrel tumbling with an abrasive mixture, to remove surface scaling caused by heat treatment step 28, and/or plating the surfaces of races 12" and 22. The plating may, for example, be a zinc coating with a clear chromate sealer applied by a barrel plating process to give the races a shiny smooth surface.

The bearing is assembled by dropping outer race 12 into a nest arrangement 32, which is provided with aperture 34 that is aligned with hole 18 of race 12" (See FIG. 3(c)). A post or die button 35 is then positioned through both of aperture 34 and hole 26. Post 35, which is dimensioned so as to prevent any of balls 36 from falling through hole 18 as they are fed into race 12", cooperates with outer race 12" to define a ball receiving channel (See FIG. 3(d)). Finally, race 22 is slipped onto post 35 and the assembly is fed to a press which snaps race 22 into race 12" (See FIG. 3(e)). It should be noted that post 35 should have a diameter small enough so that it can be received by hole 26 of race 22. After snapping race 22 into race 12 the completed ball bearing is removed from the nest 32 (See FIG. 3(f)).

In the practice of the present invention the inner diameter of rim or flange 14 must be ½% to 1% smaller than the maximum outer diameter of inner race 22 whereby these two parts define an interference fit and the inner race may be forced into the counter bore of the outer race. The races must also be concentric and, as noted above, the side wall of bearing must be straight and parallel to the axis.

While the preferred embodiment has been shown and described various modifications and substitutions may be made thereto without departing from the spirit and scope of the invention. Accordingly, it is to be understood that the present invention has been described by way of illustration and not limitation.

What is claimed is:

1. A method of manufacturing a ball bearing comprising the steps of:

forming a round cup-shaped member having a flat side wall portion and a base portion from metal stock, the base portion being partly transversely oriented with respect to said flat side wall portion;

scoring the inner surface of the formed cup-shaped member adjacent the upper periphery thereof to define a groove therein;

bending the peripheral portion of the cup-shaped member inwardly along the groove to form a radially inwardly extending flange, said flange defining a circular opening;

forming an opening in the base of the cup-shaped member, said opening being coaxial with said flange-defined opening, the axis of said opening being parallel to the straight portion of the side wall of said cup-shaped member, said cup-shaped member with coaxial openings comprising an outer race defining member;

producing an inner race defining member having a flat circular body of a diameter slightly greater than the diameter of the flange defined opening in the outer race defining member, said inner race defining member further having a tubular projection extending from the central region of said flat body, said tubular projection being open at the end disposed away from said flat body and being coaxial with said flat body;

heat treating the inner and outer race defining members;

finishing the surfaces of the inner and outer race defining members supporting the outer race defining member;

temporarily inserting a post within the outer race defining member, said post being coaxial with the outer race defining member;

positioning a discreet number of balls within the outer race defining member about the post;

inserting the tubular projection of the inner race defining member into said outer race defining member whereby said tubular projection contacts the balls and prevents travel thereof in the radially inward direction; and exerting pressure upon said inner race defining member to cause said inner race defining member flat body to snap through said flange defined opening of said outer race defining member.

2. The method of claim 1 wherein the step of producing the outer race defining member further comprises:

punching a circular disc from malleable metal stock and subsequently forming a cup therefrom.

3. The method of claim 1 wherein the step of scoring the inner surface of the cup-shaped member comprises:

producing a V-shaped 60 degree cut.

4. The method of claim 1 wherein the step of producing the inner race defining member comprises:

piercing a strip of metal of sufficient width to allow the production of the inner race;

drawing the strip about the aperture formed in the piercing step to produce the tubular projection; and blanking a circular disc from the strip, the circular disc being coaxial with the tubular projection.

5. The method of claim 3 wherein the step of producing the inner race defining member comprises:

piercing a strip of metal of sufficient width to allow the production of inner race;

drawing the strip about the aperture formed in the piercing step to produce the tubular projection; and blanking a circular disc from the strip, the circular disc being coaxial with the tubular projection.

6. The method of claim 5 whereby the step of drawing to produce the tubular projection of the inner race defining member comprises:

subjecting the strip to a first drawing operation to form a generally cup-shaped projection with the pierced hole at the base of the cup;

redrawing to flatten the side wall of the cup while enlarging the hole in the base thereof; and burnishing and qualifying the inner race defining member while still a part of the strip.

7. The method of claim 1 wherein the step of supporting the outer race defining member comprises:

placing the outer race defining member within a recess in a fixture.

8. The method of claim 5 wherein the step of supporting the outer race defining member comprises:

placing the outer race defining member within a recess in a fixture.

* * * * *

UNITED STATES PATENT AND TRADEMARK OFFICE
CERTIFICATE OF CORRECTION

PATENT NO. : 4,398,329

DATED : August 16, 1983

INVENTOR(S) : John A. Hitchner et al.

It is certified that error appears in the above-identified patent and that said Letters Patent are hereby corrected as shown below:

Column 4, line 28, delete "supporting the outer race defining member;"

Column 4, between lines 28 and 29, insert

--supporting the outer race defining member;--

Signed and Sealed this

Fourth Day of September 1984

[SEAL]

Attest:

GERALD J. MOSSINGHOFF

*Attesting Officer*  *Commissioner of Patents and Trademarks*